United States Patent [19]
Zhou et al.

[11] Patent Number: 5,965,229
[45] Date of Patent: Oct. 12, 1999

[54] OPTICAL RECORDING MEDIUM

[75] Inventors: Guo-Fu Zhou; Bernardus A. J. Jacobs, both of Eindhoven, Netherlands

[73] Assignee: U.S. Philips Corporation, New York, N.Y.

[21] Appl. No.: 08/993,133

[22] Filed: Dec. 18, 1997

[30] Foreign Application Priority Data

Dec. 24, 1996 [EP] European Pat. Off. .............. 96203711

[51] Int. Cl.$^6$ ...................................................... B32B 3/02
[52] U.S. Cl. ...................... 428/64.4; 428/64.1; 428/64.2; 428/64.6; 430/273.1; 430/271.1; 369/284; 369/116
[58] Field of Search ................................. 428/64.1, 64.2, 428/64.4, 64.6; 430/273.1, 271.1; 369/284, 116, 275.5, 13

[56] References Cited

U.S. PATENT DOCUMENTS

| | | | |
|---|---|---|---|
| 3,876,842 | 4/1975 | Bouwhuis | 179/100.41 |
| 4,658,388 | 4/1987 | Ishiwatari et al. | 369/13 |
| 5,234,737 | 8/1993 | Ueno et al. | 428/64 |
| 5,498,507 | 3/1996 | Handa et al. | 130/273.1 |
| 5,818,808 | 10/1998 | Takada et al. | 369/116 |

FOREIGN PATENT DOCUMENTS 08287515  1/1996  Japan .

*Primary Examiner*—William Krynski
*Assistant Examiner*—Hong J. Xu
*Attorney, Agent, or Firm*—Michael E. Belk

[57] ABSTRACT

An optical recording medium has a phase-change recording layer embedded in a stack of thin layers arranged on a substrate. At least one of the dielectric layers adjacent to the recording layer comprises a carbide. The carbide layer is separated from the substrate and/or from a reflecting layer in the stack by a dielectric layer not containing a carbide. The thickness of the carbide layer either lies in a range from 2 to 8 nm or is substantially equal to the thickness of the adjacent dielectric layer.

16 Claims, 1 Drawing Sheet

OPTICAL RECORDING MEDIUM

FIELD OF THE INVENTION

The invention relates to the field of phase change type optical recording medium.

BACKGROUND OF THE INVENTION

The invention relates to an optical recording medium having a substrate and a stack of thin layers provided thereon, the stack comprising a first dielectric layer and a second dielectric layer, a recording layer being able to change between two crystallographic states and arranged between the dielectric layers, a third dielectric layer arranged between the recording layer and the first dielectric layer, and a reflective layer.

The invention also relates to the use of such an optical recording medium in high storage density and high data rate applications.

Optical information or data storage based on the phase change principle is attractive, because it combines the possibilities of direct overwrite (DOW) and high storage density with easy compatibility with read-only systems. Phase-change optical recording involves the formation of micrometer-sized and sub-micrometer-sized amorphous recording marks in a thin crystalline film using a focused radiation beam. During recording information, the medium is moved with respect to the focused radiation beam which is modulated in accordance with the information to be recorded. After heating by the radiation beam to a temperature above the melting temperature, the recording layer is quenched, thereby causing the formation of amorphous information marks in the exposed areas of the recording layer which remains crystalline in the unexposed areas. Erasure of written amorphous marks is realized by heating the recording layer with a radiation beam to a temperature below the melting temperature during a time longer than the crystallization time of the recording layer, allowing the recording layer at the position of the mark to recrystallize. The amorphous marks represent the data bits, which can be reproduced by scanning the recording medium through the substrate by a low-power focused radiation beam. Reflection differences of the amorphous marks with respect to the crystalline recording layer bring about a modulated laser-light beam which is subsequently converted by a detector into a modulated photocurrent in accordance with the coded, recorded digital information. The modulated photocurrent is an HF information signal representing the written marks, and, therefore, the written information.

The main problems in phase-change optical recording are the required large number of overwrite cycles (cyclability), i.e. the number of repeated writing (amorphization) and erasing (recrystallization) operations, and a proper crystallization speed. High crystallization speed is particularly required in high data rate applications, where the complete crystallization time has to be shorter than 100 ns, preferably as short as 30 to 70 ns. If the crystallization speed is not high enough to match the linear velocity of the medium relative to the laser-light beam, the old data (amorphous marks) from the previous recording will not be completely erased (recrystallized) during direct overwrite (DOW). This will cause a high noise level.

An optical recording medium of the type mentioned in the opening paragraph is known from U.S. Pat. No. 5,234,737. The known medium of the phase-change type comprises a disc-shaped substrate carrying a stack of layers consisting, in succession, of a first dielectric layer, a recording layer of a phase-change Ge-Sb-Te alloy, a second dielectric layer and a metal reflective layer. Such a stack of layers can be referred to as an IPIM structure, wherein M represents a reflective or mirror layer, I represents a dielectric layer and P represents a phase-change recording layer. A third dielectric layer, preferably of $SiO_2$, has been arranged between the first dielectric layer and the recording layer to achieve a desired thermal behaviour of the medium during writing information in the medium by means of a radiation beam. The material of the third dielectric layer may also be chosen from $MgF_2$, $CaF_2$, $Al_2O_3$, $CeF_3$, $NdF_3$, $LaF_3$, $NaF$, $NiF$, $Na_3LaF_6$, $ZnS$, $ZnS-SiO_2$, $SiC$, $In_2O_3$, $SnO_2$, $Si_3N_4$, $Ta_2O_5$, $SiO$, $TiO$, $TiO_2$, $TiN$, $TiC$ and $ZrO_2$.

The above citations are hereby incorporated in whole by reference.

SUMMARY OF THE INVENTION

It is an object of the invention to provide, inter alia, an erasable optical recording medium which is suitable for high speed recording, such as rewritable DVD and optical tape, and which has an excellent cyclability during repeated recording and erasing operations, resulting in good DOW characteristics. High speed recording is to be understood to mean in this context a linear velocity of the medium relative to the laser-light beam of at least 2.4 m/s, which is two times the speed according to the compact disc standard. The jitter of the medium should be at a low, constant level during at least $10^5$ DOW-cycles. Jitter is a measure of the distortion of the shape of a recording mark, and is measured as a time shift of rising and falling edges in the information signal.

This object is achieved in accordance with the invention by an optical recording medium as described in the opening paragraph, which is characterized in that the third dielectric layer comprises a carbide. An investigation of the known recording medium has revealed that the behaviour of the stack under thermoshock, i.e. the sudden increase and decrease of temperature during writing, limits the cyclability. In particular, the chemical decomposition at high temperature of the dielectric layers adjacent the recording layer and diffusion of atoms into the recording layer affects the recording layer, resulting in deterioration of the quality of the written marks. This problem can be mitigated when at least one dielectric layer adjacent to the recording layer is made of a transparent material having a high enthalpy of formation. The materials in the class of the carbides comply with this requirement. The high enthalpy of formation makes the material very stable, so it will not decompose at the high write temperatures. The carbide layer thus provides an very high cyclability. Moreover, the carbide layer yields a high crystallisation speed of the recording layer, while keeping the write power of the radiation beam at a relatively low level. The carbide layer may be arranged on either side of the recording layer. The carbide layer must be combined with a dielectric layer of another material, here the first dielectric layer, because a stack having a single layer of carbide between the recording layer and the substrate or reflection layer cannot realize the desired thermal properties.

The crystallisation time can be reduced further when a fourth dielectric layer comprising a carbide is arranged between the recording layer and the second dielectric layer.

The first and second dielectric layers are preferably made of a mixture of $ZnS$ and $SiO_2$, e.g. $(ZnS)_{80}(SiO_2)_{20}$. The layers may also be made of $SiO_2$, $TiO_2$, $ZnS$, $AlN$ and $Ta_2O_5$.

For the metal mirror layer, metals such as Al, Ti, Au, Ni, Cu, Ag and Cr, and alloys of these metals, can be used.

Both the reflective layers and the dielectric layers can be provided by vapour deposition or sputtering.

Optionally, the outermost layer of the stack is screened from the environment by means of a protective layer of, for example, UV light-cured poly(meth)acrylate.

In a specific embodiment of the recording medium according to the invention the third, and possibly fourth dielectric layer, have a thickness between 2 and 8 nm. The relatively high thermal conductivity of the carbide will only have a small effect on the stack when the thickness of the layers is small, thereby facilitating the thermal design of the stack. The advantageous effects of the carbide layer on the cyclability are maintained within the thickness range.

In another embodiment the third dielectric layer has a thickness substantially equal to the thickness of the first dielectric layer. Substantial means equal to within 20% of the total thickness of the first and third layer. The equality of the thicknesses is advantageous in the manufacture of the medium. In general the stack is evaporated or sputtered in a vacuum chamber, where substrates move stepwise along a series of stations having targets of different compositions. The dwell time at each station is about equal, and the thickness of the layer deposited at a station is determined in part by switching the deposition process on and off. Consequently, the deposition of a thin layer may require less time than available at a station, whereas the deposition of a thick layer may even require two adjacent stations having the same target. It is therefore advantageous to replace a relatively thick layer and a relatively thin layer by two layers of about equal thickness, thereby reducing the number of deposition stations and the manufacturing time of a stack. Moreover, if a thick layer of expensive material, such as $(ZnS)_{80}(SiO_2)_{20}$ and a thin layer of cheaper material, such as SiC, is replaced by two layers of equal thickness, the manufacture also becomes cheaper.

The total thickness of the dielectric layers between the substrate and the recording layer is preferably larger than or equal to 70 nm. If the total thickness is smaller than 70 nm, the cyclability is reduced considerably.

The total thickness is preferably smaller than 70 nm plus $\lambda/(2n)$, where $\lambda$ is the wavelength for which the recording medium is designed and n the refractive index of the dielectric layers. When the dielectric layers between the substrate and the recording layer have different refractive indices, the equivalent refractive index of the two layers should be used. A larger total thickness does not increase the cyclability anymore and is more expensive to make. If for example the wavelength is equal to 630 nm and the refractive index is 1.5, the range extends from 70 nm to 280 nm.

The actual total thickness is determined by the optimization of the entire stack in order to achieve the desired optical properties of the medium. From an optimization procedure one can find a minimum total thickness $d_{min}$ giving the desired optical properties. If this thickness is equal to or larger than 70 nm, this thickness is the preferred value. If the thickness is smaller than 70 nm, the thickness must be increased by the smallest number of steps of $\lambda/(2n)$, such that the increased value is equal to or larger than 70 nm. At each step, the optical properties of the stack are similar, but the thermal properties change. The preferred total thickness can be expressed as the value which fulfils $[d_{min}+m\lambda/(2n)]$ $\geq 70$ nm for the smallest value of integer m.

The thickness of the dielectric layers between the recording layer and the reflective layer is preferably larger than or equal to 20 nm. A smaller thickness results in an increased cooling rate of the recording layer and, consequently, an undesirable increase in the write power. The thickness is preferably smaller than 40 nm. A larger thickness decreases the thermal contact between the recording layer and the reflector too much, resulting in too low a cooling rate of the recording layer and a worse recording performance.

The carbide is preferably a member of the group SiC, ZrC, TaC, TiC, WC and which combine an excellent cyclability with a short crystallisation time. SiC is a preferred material because of its optical, mechanical and thermal properties.

The recording layer preferably comprises a Ge-Sb-Te compound. The compound is preferably taken from an area in the ternary Ge-Sb-Te composition diagram around the tie-line connecting GeTe and $Sb_2Te_3$ and having a width of 2 at. % in Te and Sb. The compound has preferably a stoichiometric composition, e.g. $Ge_2Sb_2Te_5$, $GeSb_2Te_4$ or $GeSb_4Te_7$, because these materials crystallize fast, since no segregation is required during crystallisation.

The crystallization speed of said Ge-Sb-Te alloys depends strongly on the thickness of the recording layer. The important parameter is the complete erase time $t_c$ (in ns), which is defined as the minimum duration of the erasure pulse for complete crystallization of a written amorphous mark in a crystalline environment, which is measured statically. The complete erase time $t_c$ decreases rapidly as the layer thickness increases up to 27 nm, and it tends to saturate at a value of about 50–60 ns upon further increase of the layer thickness. When the recording layer is thicker than 27 nm, $t_c$ is essentially independent of thickness. For thicknesses larger than 25 nm $t_c$ is smaller than 100 ns, which is necessary for high speed recording. From the viewpoint of $t_c$, the thickness of the recording layer should be at least 25 nm, preferably at least 27 nm. The thickness of the recording layer is preferably smaller than 35 nm in order to reduce the variation in the optical contrast M as a function of rewrite cycles. The optical contrast M is defined as $|R_C-R_A|/R_C$, where $R_c$ and $R_A$ are the reflections of the recording material in the crystalline and amorphous state respectively. When the SiC layer is arranged between the phase change layer and the dielectric layer, the thickness dependence of complete erasure time is shifted to thinner layers. The saturation value of the complete erasure time is also shifted to 25 to 30 ns.

If desired, $t_c$ can be increased by diverging from the tie-line between GeTe and $Sb_2Te_3$ by adding up to 3 at. % Sb to the Ge-Sb-Te alloys on the claimed tie-line. By adding 3 at. % to $GeSb_2Te_4$ $t_c$ increases from 60 to 100 ns. Such an addition increases the recording sensitivity, i.e. it lowers the melting threshold power $P_m$.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 1.2 mm or 0.6 mm for medium and high information density applications.

Alternatively, the substrate may be in the form of a synthetic resin flexible tape, made e.g. from a polyester film. In this way an optical tape will be obtained for use in an optical tape recorder, which is for example based on a fast spinning polygon. In such a device the reflected radiation beam scans transversely across the tape surface.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer, for example, of a UV light-cured layer of acrylate, which is separately provided on the substrate. In high-density recording such a groove has a pitch e.g. of 0.5–0.8 μm and a width of about half the pitch.

High-density recording and erasing can be achieved by using a short-wavelength laser, e.g. with a wavelength of 675 nm or shorter (red to blue).

The phase change recording layer can be applied to the substrate by vapour depositing or sputtering of a suitable target. The layer thus deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the Ge-Sb-Te alloy, e.g. 180° C. A synthetic resin substrate, such as polycarbonate, can alternatively be heated by a radiation beam of sufficient power. This can be realized, e.g. in a recorder, in which case a laser beam scans the moving recording layer. The amorphous layer is then locally heated to the temperature required for crystallizing the layer, without the substrate being subjected to a disadvantageous heat load.

If desired, an additional thin metal layer can be inserted between the substrate and the first dielectric layer, thereby forming a so called MIPIM-structure. Although the structure becomes more complicated, the additional metal layer increases the cooling rate of the recording layer as well as the optical contrast M.

The objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
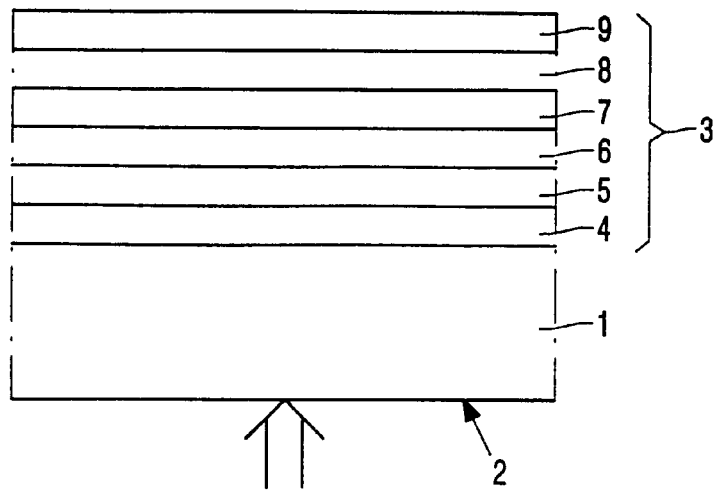
FIG. 1 shows a cross-section of an recording medium according to the invention.

FIG. 1 is a cross-section of a first embodiment of an optical recording medium according to the invention. The recording medium comprises a substrate 1 which may be made of, for example, a sheet of plastic or glass. A radiation beam, generated in an optical scanning apparatus as described in, for example U.S. Pat. No. 3,376,842 (PHN 6.296) with which the record carrier can be written and/or read, enters the substrate through an entrance face 2 of the record carrier. This beam is diagrammatically illustrated by means of an arrow p in the Figure. A stack 3 arranged on the substrate comprises two dielectric layers 4 and 5, a recording layer 6, two further dielectric layers 7 and 8 and a reflective layer 9. At the side of the stack the record carrier may be coated with a protective coating which may be made of an organic material. The information is or has been laid down in the recording layer in the form of information areas which are optically distinguished from their surroundings. These areas may have, for example, a different refractive index and hence a different reflection coefficient than their surroundings.

By suitable choice of the thickness and refractive indices of the layers in stack 3 it is possible to give the reflection of the total record carrier as well as the optical contrast of the areas the desired value. It is also possible to reverse the contrast of the areas, i.e. if an area in a recording layer without any adjacent layers has a lower reflection than its surroundings, the reflection of this area can be increased with respect to its surroundings by providing the adjacent layers.

The stack of the embodiment of the recording medium shown in FIG. 1 has the following characteristics. Dielectric layer 4 is made of the dielectric material $(ZnS)_{80}(SiO_2)_{20}$ and has a thickness of 115 nm. Dielectric layer 5 is a 5 nm thickness SiC layer. Recording layer 6 is made of $GeSb_2Te_4$ having a thickness of 27 nm. Dielectric layer 7 is a SiC layer of 5 nm thickness. Dielectric layer 8 is made of $(ZnS)_{80}(SiO_2)_{20}$ and has a thickness of 21 nm. Reflective layer 9 is a 100 nm layer of an aluminum alloy, e.g. AlCr or AlTi. The complete erasure time has been measured to be equal to 44 ns, which is sufficiently short to allow high-speed recording. The jitter of a pattern read from the medium as a function of the overwrite cycle does not show a large overshoot. The number of overwrite cycles before deterioration of the medium becomes noticeable is 1200 000. The write power for the medium is relatively low and is 19 mW at the entrance face of the medium at a relative speed between the radiation beam and the medium of 7.2 m/s.

The cyclability is measured as the number of rewrite cycles where the jitter has increased to 12% of the clock time $T_c$. The jitter is the standard deviation of the difference between the rising and falling edges in the information signal and the data clock recovered from the information signal. As an example, for a standard CD format written with the so-called EFM code at the CD speed of 1.2 m/s and clock time of 230 ns, the jitter should be lower than 28 ns.

The influence of the kind of material used for dielectric layers 5 and 7 has been shown in a series of experiments. A second medium, not according to the invention, is prepared using ZnS as material for dielectric layers 5 and 7, whereas the materials of the other layers 4, 6, 8 and 9 and the thickness of all layers is the same as for the above first embodiment. The cyclability is measured to be 30 000. When ZnS is replaced by $Ta_2O_5$, $SiO_2$, $Si_3N_4$, and AlN, keeping the other parameters the same, the cyclability is 35 000, 70 000, 100 000, and 200 000 respectively. This should be compared with the cyclability of 1200 000 when using SiC.

The melting points of bulk ZnS, $Ta_2O_5$, $SiO_2$, $Si_3N_4$, AlN and SiC are 2100, 2150, 2256, 2170, ~2470 and 2970 K respectively. This correspondence between the cyclability and the melting temperature suggest that a high melting temperature can give rise to a high cyclability. A similar correspondence has not been observed between the thermal expansion of the materials and the cyclability. A high melting point is related to a high enthalpy of formation. A compound having a high enthalpy of formation is relatively stable against decomposition. During writing a recording layer of a Ge-Sb-Te compound is heated to a temperature between about 1000 and 1100 K, well above its melting temperature, which is about 910 K. The temperature during recording is rather close to the crystallization temperatures of ZnS and $SiO_2$, which temperatures lie a few hundred K below the melting temperature. A dielectric layer of ZnS will thus be heated close to its crystallization temperature, causing the atoms in the layer to become mobile. These atoms will then be able to diffuse towards the recording layer. The properties of the recording layer will be affected by the influx of foreign atoms, resulting in a deterioration of the recording process. A high melting temperature of the material used for the dielectric layer neighbouring the recording layer will therefore result in an increased cyclability of the recording medium. Materials made of oxides and sulfides have a lower melting temperature than nitrides, which in turn have a lower melting temperature than carbides. Therefore, carbides are preferred materials for making dielectric layers adjacent to a recording layer.

In a second embodiment of the recording medium according to the invention, stack 3 has the same order of layers as shown in FIG. 1, but with the following materials and thicknesses. Dielectric layer 4 is made of $(ZnS)_{80}(SiO_2)_{20}$ and has a thickness of 60 nm. Dielectric layer 5 is a 60 nm thickness SiC layer. Recording layer 6 is made of $GeSb_2Te_4$ having a thickness of 27 nm. Dielectric layer 7 is a SiC layer of 5 nm thickness. Dielectric layer 8 is made of $(ZnS)_{80}(SiO_2)_{20}$ and has a thickness of 21 nm. Reflective layer 9 is a 100 nm layer of an aluminum alloy.

A third embodiment of the recording medium has the same layer thicknesses and materials as the second embodiment, except that the SiC dielectric layer 7 is not present.

Figure 2:
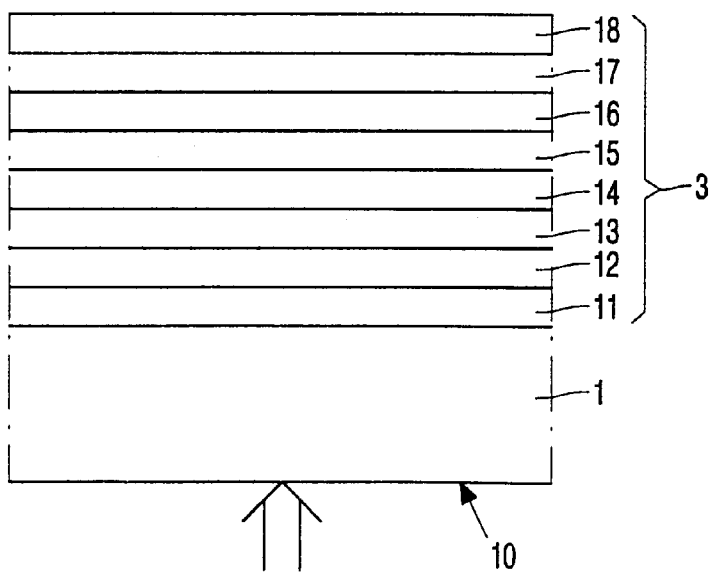
FIG. 2 shows a cross-section of another recording medium according to the invention.

A fourth embodiment of the recording medium is shown in FIG. 2. Its stack has a so-called IMIIPIIM structure and has been designed for a wavelength of 670 nm. The medium has the following features. Substrate 10 is an 0.6 mm thickness polycarbonate (PC) disc. Dielectric layer 11 is made of the dielectric material $(ZnS)_{80}(SiO_2)_{20}$ and has a thickness of 50 nm. Mirror layer 12 is a 5 nm Al layer. Dielectric layer 13 is made of $(ZnS)_{80}(SiO_2)_{20}$ and has a thickness of 125 nm. Dielectric layer 14 is a 5 nm thickness SiC layer. Recording layer 15 is made of $GeSb_2Te_4$ having a thickness of 30 nm. Dielectric layer 16 is a SiC layer of 5 nm thickness. Dielectric layer 17 is made of $(ZnS)_{80}(SiO_2)_{20}$ and has a thickness of 21 nm. Reflective layer 18 is a 100 nm layer of an aluminum alloy. The medium shows a very high modulation.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. An optical recording medium, comprising:
   a substrate; and
   a stack of thin layers provided on the substrate, including:
   a first dielectric layer;
   a second dielectric layer;
   a recording layer for changing between two crystallographic states and between the dielectric layers;
   a third dielectric layer between the recording layer and the first dielectric layer, of a different material than the first dielectric layer and including a carbide; and
   a reflective layer.

2. The medium of claim 1, wherein the stack further includes a fourth dielectric layer of a different material than the second dielectric material and including a carbide between the recording layer and the second dielectric layer.

3. The medium of claim 1, wherein the third dielectric layer has a thickness between 2 and 8 nm.

4. The medium of claim 2, wherein the fourth dielectric layer has a thickness between 2 and 8 nm.

5. The medium of claim 1, wherein the third dielectric layer has a thickness substantially equal to the thickness of the first dielectric layer.

6. The medium of claim 1, wherein the distance between the substrate and the recording layer is larger than or equal to 70 nm.

7. The medium of claim 1, wherein the distance between the substrate and the recording layer is smaller than or equal to the sum of 70 nm and half of a predetermined wavelength of a laser beam for scanning the medium divided by the refractive index of the at least one layer between the substrate and the recording layer.

8. The medium of claim 1, wherein the distance between the recording layer and the reflective layer is larger than or equal to 20 nm.

9. The medium of claim 1, wherein the distance between the recording layer and the reflective layer is smaller than or equal to 40 nm.

10. The medium of claim 1, wherein the carbide is a member of the group SiC, ZrC, TaC, TiC, and WC.

11. The medium of claim 1, wherein the recording layer comprises a GeSbTe compound.

12. The medium of claim 11, wherein the compound has a stoichiometric composition.

13. The medium of claim 1, wherein the recording layer has a thickness between 10 and 35 nm.

14. A method for high speed recording, comprising:
   providing a substrate; and
   providing a stack of thin layers on the substrate, including::
   a first dielectric layer;
   a second dielectric layer;
   a recording layer for changing between two crystallographic states and between the dielectric layers;
   a third dielectric layer between the recording layer and the first dielectric layer, of a different material than the first dielectric layer and including a carbide;
   a reflective layer;
   in which the medium is scanned by scanning the recording layer with a radiation beam at a velocity with respect to the recording layer of at least 2.4 m/s.

15. The medium of claim 1, in which the third dielectric layer consists essentially of the carbide.

16. The medium of claim 2, in which the fourth dielectric layer consists essentially of the carbide.

* * * * *